June 23, 1970  J. M. CHECK  3,517,153
WIRE ELECTRODE HOLDER ASSEMBLY
Filed June 7, 1967
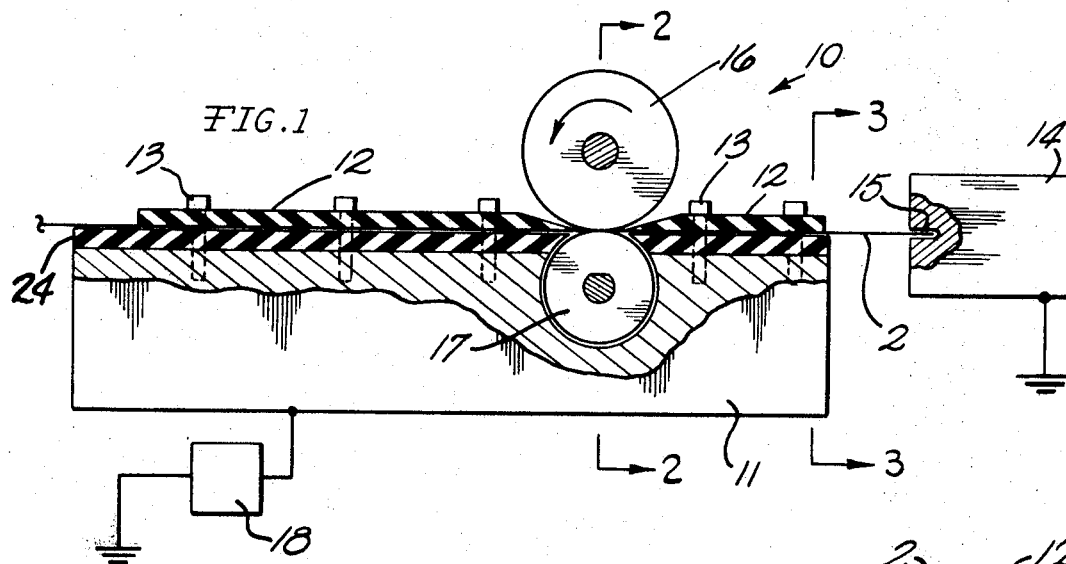
FIG.1
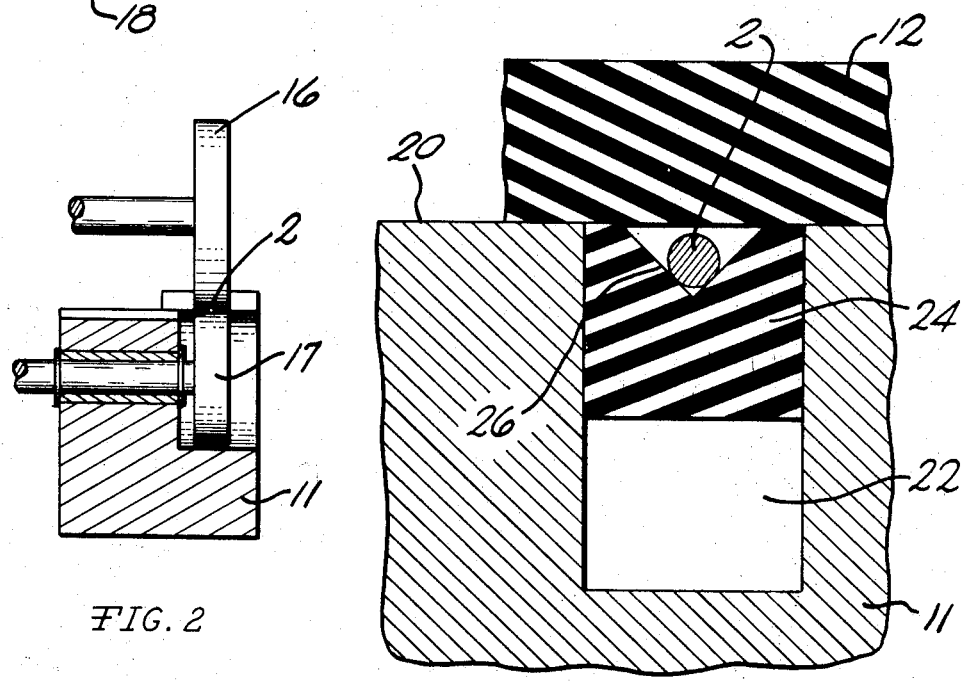
FIG.2
FIG.3
INVENTOR.
JOHN M. CHECK
BY
Olsen and Stephenson
ATTORNEYS

United States Patent Office 3,517,153
Patented June 23, 1970

3,517,153
WIRE ELECTRODE HOLDER ASSEMBLY
John M. Check, Ann Arbor, Mich., assignor to Raycon Corporation, Ann Arbor, Mich., a corporation of Michigan
Filed June 7, 1967, Ser. No. 644,258
Int. Cl. B23p *1/12*
U.S. Cl. 219—69　　　　　　　　　　　　　　　3 Claims

ABSTRACT OF THE DISCLOSURE

A holder for small diameter tungsten wire electrodes for electric discharge machining apparatus having an insulating material between the holder and the wire to support the wire against radial movement during feeding of the wire while blocking stray electric currents between the electrode holder and the wire thereby reducing wire electrode breakage.

CROSS REFERENCES TO RELATED APPLICATIONS

The electrode holder assembly of this invention is suitable for use in electric discharge machining apparatus such as is shown in U.S. application Ser. No. 501,910, filed Oct. 22, 1965, and owned by the assignee of this application.

BACKGROUND OF THE INVENTION

Electric discharge machining or EDM is a method of machining electrical current conducting materials, particularly metal, by utilizing the energy from electrical discharges from an electrode to erode away the part being machined. In EDM apparatus which employs a wire as the electrode, current is passed through the electrode from a holder which permits the electrode to move in an axial direction but prevents it from moving radially. The electrode is moved axially so as to maintain it in close proximity with the part being machined by the erosion caused by the electrical discharge at the end of the electrode. As the part being machined erodes away the electrode continues to move in an axial direction to maintain the proper gap between the electrode and the part. This erosion takes place because of the poor contact between the part which is held at ground potential and the electrode which is held at a positive or a negative potential. Electric discharge erosion may also take place where there is poor electrical contact sufficient to cause minute arcing, such as between the wire electrode and the electrode holder. In cases in which the electrode is of a relatively large diameter, this arcing between the electrode and the holder may not cause any serious problems, but when small wire is used for the electrode it has a tendency to break occasionally. This may be due to heat hardening of the wire or it may be due to spark eroding of the wire causing pitting and consequent weakening of the wire.

In the equipment such as is shown in the above-mentioned application, the electrode may be a small wire no more than .003 inch in diameter. Any erosion along the surface of this wire caused by arcing will affect the wire strength considerably by pitting the wire so as to cause stress concentration points and reduce the diameter of the wire by a substantial percentage. The present invention seeks to eliminate this weakening of electrodes by insulating the wire from the holder except at the point or points where a firm grip on the wire is maintained by the mechanism which feeds the wire through the holder. All the current is then fed through this firm gripping mechanism where there is very good electrical contact and thus no sparking. No prior art is known which teaches this invention.

SUMMARY OF THE INVENTION

In electrical discharge machining apparatus of the type to which this invention is applicable, a wire electrode is propelled axially by means which includes a metal wheel which is also the main electrical connection between the current source and the electrode. The wire is maintained in very good electrical as well as physical contact with this wheel by means of a resilient wheel opposite the current carrying wheel. The wire is fed between the wheel through a channel in an electrode holder to keep the wire from kinking as it approaches the work. However, the contact between the holder channel and the wire cannot be as tight as that between the feeding wheel and the wire since the frictional resistance would prevent the wire from being fed. Since the holder must be held at a very high potential to pass current to the wire through the wheel, which is part of the holder, and there cannot be intimate contact between the wire and the holder, it is necessary that the wire be at the same potential as the holder in order not to have small arcing. As the diameter of the wire electrode gets smaller, for eroding small holes, the magnitude of two problems increases. First, the electrical resistance of the wire increases, thus causing a potential difference to develop which is directly proportional to the distance of a point on the wire from the point of contact between the wheel and the wire. Second, any pits in the wire caused by even very minute arcing become much more serious because of the greater percentage of reduction of the wire cross section.

Since the wire becomes more fragile as it gets smaller in diameter, it becomes less feasible to hold the wire in the holder tight enough to get a good electrical contact between wire and holder. This invention therefore provides insulating material forming the holder channel which has a low coefficient of friction thus facilitating guided wire movement and at the same time preventing arcing between the holder and the wire electrode.

Further objects, features and advantages of this invention will become apparent from a consideration of the following description, the appended claims, and the accompanying drawing in which:

FIG. 1 is an elevational view of the wire electrode holder assembly of this invention, with some parts broken away and other parts shown in section for purposes of clarity, and showing an electrode mounted thereon an in operative position relative to a workpiece; and FIGS. 2 and 3 are sectional views of the assembly of this invention as seen from substantially the lines 2—2 and 3—3, respectively, in FIG. 1.

With reference to the drawing, the holder assembly of this invention, indicated generally at 10, is illustrated in FIG. 1 as including a metal body 11 on which a pair of cover strips 12 are mounted by means of screws 13. A wire electrode 2, which can be of tungsten or other suitable material, and of a very small diameter such as a diameter of 0.003", is supported on the body 11 and maintained in a predetermined position thereon by the cover 12. The wire electrode 2 is normally fed from a reel (not shown), such as is illustrated in the aforementioned copending application, and is moved from the reel in an axial direction along the body 11 toward a workpiece, indicated generally at 14, which is to be formed with a hole such as is shown at 15.

A power driven wheel or roller 16, formed of a resilient material such as rubber, is positioned in peripheral pressure engagement with a metal wheel 17 which is in electrical contact with and rotatably supported on the body 11, as shown in FIG. 2. A current source 18 supplies electric current to the holder body 11 from which the current flows through the wheel 17 to the electrode 2, which is disposed between the wheels 16 and 17, as shown in FIG. 2, and then through the electrode 2 to the workpiece 14. On rotation of the wheel 16 in the direction illustrated in FIG. 1, the electrode 2 is fed toward the workpiece 14.

As shown in FIG. 3, the body 11 is formed on its top side 20 with a slot 22, illustrated as being of rectangular shape. A two-piece block 24 formed of an electrical insulating material having low frictional characteristics is supported in the slot 22 and is formed on its top side with a groove or channel 26 of substantially V-shape in cross section. The groove 26 is disposed adjacent the cover strips 12 so that when an electrode 2 is disposed in the groove 26, it is confined between the cover strips 12 and the block 24 during travel of the electrode 2 along the holder 11. The strips 12 are also formed of insulating material so that the electrode 2 is fully insulated from the body 11 at all points except when traveling across the space between the strips 12 where the electrode 2 engages the wheel 17. During movement of the electrode 2 across the space between the cover strips 12, the electrode 2 is maintained in firm engagement with the current carrying wheel 17 by the pressure roller 16.

It can thus be seen that during use of the holder assembly 10, the electrode 2 is moved axially through the V-groove 26, with the insulating block 24 positively precluding any arcing between the electrode 2 and the holder body 11. By virtue of the fact that the block 24 is formed of a material having low frictional characteristics, such as a glass fiber reinforced polyester, the axial feeding forces on the wire electrode 2 are reduced, thus further decreasing the chances for breakage of the electrode 2. In addition, the assembly 10 can be maintained in a desired service condition over prolonged periods of use by merely replacing the block 24 without the necessity for replacing the entire holder body 11, which is much more expensive than the block 24. Further, a plurality of interchangeable blocks 24 having V-grooves 26 of varying sizes can be provided where electrodes 2 of different diameters are to be used with the holder 11.

What is claimed is:

1. An electrode assembly for EDM apparatus utilizing wire for an electrode, said assembly comprising a body of electrically conductive material having an open channel in a face thereof, a strip of electrically insulating material substantially filling at least a major portion of the mouth of said channel and having a longitudinally extending groove therein of a cross section for guiding a wire electrode axially of the wire and the groove, and a rotatable electrically conductive member engaging said wire intermediately of the extent of said strip for both feeding said wire and conducting electric current thereto.

2. A wire electrode holder assembly having the structure set forth in claim 1 wherein said means for conducting current is a rotatable member made from electric current conducting material and further including means engaged with said rotatable member for holding a wire electrode in firm moving contact therewith.

3. A wire electrode holder assembly having the structure set forth in claim 1 wherein said groove is of a substantially V-shape in transverse cross section, and further including cover means formed of an electrical insulating material and secured to said body so as to engage said strip and overlie said groove.

References Cited

UNITED STATES PATENTS

| | | |
|---|---|---|
| 2,040,030 | 5/1936 | Snyder et al. _____ 314—68 X |
| 2,794,110 | 5/1957 | Griffith. |
| 2,945,936 | 7/1960 | Carman. |
| 3,098,148 | 7/1963 | Piot et al. |
| 3,279,669 | 10/1966 | Bernard _____ 219—130 X |

JOSEPH V. TRUHE, Primary Examiner

R. F. STAUBLY, Assistant Examiner

U.S. Cl. X.R.

204—143; 314—68